No. 755,372. Patented March 22, 1904.

UNITED STATES PATENT OFFICE.

JOSEPH KOENIGER, OF COLOGNE, GERMANY.

MANUFACTURING ORE BRICKS.

SPECIFICATION forming part of Letters Patent No. 755,372, dated March 22, 1904.

Application filed July 8, 1902. Serial No. 114,830. (No model.)

*To all whom it may concern:*

Be it known that I, JOSEPH KOENIGER, civil engineer, a subject of the King of Bavaria, residing at 25 Aachenerstrasse, in the city of Cologne, Kingdom of Prussia, German Empire, have invented a certain new and useful Process of Manufacturing Weatherproof Bricks for Smelting Purposes from Sandy Ore or Ore-Dust and the Like, of which the following is a specification.

This invention has reference to a process for manufacturing bricks for smelting purposes from lower-grade ores or such which heretofore presented great difficulties in the smelting process, as they could not be reduced to compact bricks—such as sandy ores, ore-dust, slimes, tailings, blast-furnace tunnel-dust, residue of burnt iron and copper pyrites, and other materials of this and a similar nature—the process providing means whereby these materials may be shaped into bricks which will resist the action of the weather and can be easily smelted. In the manufacture of bricks of this kind an addition is made of substances capable of chemical action—such as lime, magnesia, borax, sulfuric acid, and water, the lime being used for the purpose of solidifying the material, for purifying the earthy components of the crude ore or other raw material employed in the smelting operation, and it also is operative in making the brick weatherproof. The addition of magnesia causes the consistency and cohesiveness of the stock until the fusion temperature is reached, when this addition is removed without leaving an objectionable residue. Borax acts as a solvent for the oxids of the metals, and it also has the effect of binding the constituents together and to retain them up to the point of fusion, when it also separates out in the slag. Sulfuric acid is added in form of sulfuric-acid anhydrid or as crude acid, this addition resulting in a rapid drying of the bricks. In the smelting operation the sulfuric acid is removed without any injurious effect upon the process even before the point of fusion is reached. Water at last serves as a diluent for the sulfuric acid added, and as a binding agent for the other components, and it is also removed when the bricks are dried before the smelting operation. The combined effect of these chemically-acting additions is greatly assisted by suitable automatically-operated brick-molding devices, and in particular by mixing and saturating the material with the additions in definite proportions checked by the results of chemical tests, the several components being most intimately mixed and being then pressed into suitable molds and any desired sizes, when the bricks are ready to be fed to the smelting-furnace.

As regards the carrying out of the process, it may be remarked that the amount of magnesia and borax necessary for addition is governed by the results of previous chemical tests of the substances it is desired to submit to the brick-making operation. In the case of an ore residue with fifty to sixty per cent. of iron the following proportions may be used for each 100 (one hundred) pounds of ore residue—that is to say, an addition is made of 18.2 pounds of lime, $(CaO,)$ 2.6 to 4.5 pounds of magnesite, $(MgCO_3,)$ 2.1 to 4.2 pounds of borax, $(Na_2B_4O_7,)$ 5.8 parts (in weight) of sulfuric-acid anhydrid, $(SO_3,)$ twenty-five and more parts (in weight) of water, $(H_2O,)$ these proportions being merely approximative, however.

The amount of iron lost after the brick making and smelting processes as a result of the said additions is not above two and one-half to three per cent. under the most unfavorable circumstances, and the run of the furnace is not interfered with in the least by these additions. In calculating the proportions of the various additions it is to be noted that the amount of lime mentioned should be reduced in the proportion of the quantity of lime present in the ore submitted to the process. The several materials are mixed in the right proportion, and they are then stirred up together first in a dry and then in a wet condition in a drum, the materials being first intimately mixed in a dry condition and being then mixed with liquid in form of crude sulfuric acid and water, the sulfuric acid being completely mixed with the water before adding the same. The intimately and uniformly mixed ingredients are fed into the brick-molding machine and are then compressed to form bricks, which are dried in suitable rooms or places, and after about fourteen days bricks of medium size are ready for smelting, their percentage of moisture being not higher than that of the iron ores ordinarily employed for the smelting operation.

What I claim, and desire to secure by Letters Patent of the United States, is—

1. The process for manufacturing weatherproof bricks for smelting purposes from sandy ores or ore-dust, ore residues, tunnel-dust, burnt iron and copper pyrite residues and from similar material, which consists in mixing the materials which are to be submitted to the process in a dry condition with lime, magnesia and borax and then intimately mixing the resultant mass with dilute crude sulfuric acid, then pressing and molding the mixture and drying the resultant bricks.

2. As a new article of manufacture, a smelting-brick consisting of ore material, lime, magnesia, borax and diluted sulfuric acid, as set forth.

In witness whereof I have hereunto signed my name in the presence of two subscribing witnesses.

JOSEPH KOENIGER.

Witnesses:
CHARLES LESIMPLE,
CARL SCHMITT.